United States Patent
Sundseth

[11] Patent Number: 5,351,808
[45] Date of Patent: Oct. 4, 1994

[54] ROLLER DRIVE ASSEMBLY

[75] Inventor: Jarl Sundseth, Neuhaus, Fed. Rep. of Germany

[73] Assignee: Electro Pneumatic International GmbH, Fed. Rep. of Germany

[21] Appl. No.: 98,472

[22] Filed: Jul. 27, 1993

[30] Foreign Application Priority Data

Jul. 27, 1992 [DE] Fed. Rep. of Germany ....... 4224816

[51] Int. Cl.$^5$ ............................................. B65G 13/02
[52] U.S. Cl. .................................. 198/782; 198/722; 244/137.1
[58] Field of Search ....................... 198/780, 782, 722; 244/137.1; 492/38, 39, 30, 36

[56] References Cited

U.S. PATENT DOCUMENTS

| | | | |
|---|---|---|---|
| 3,899,070 | 8/1975 | Lang | 198/782 |
| 4,697,694 | 10/1987 | Huber | 198/782 |
| 4,765,273 | 8/1988 | Anderle | 198/722 |
| 5,205,398 | 4/1993 | Hart et al. | 198/780 |

*Primary Examiner*—Joseph E. Valenza
*Attorney, Agent, or Firm*—Reising, Ethington, Barnard, Perry & Milton

[57] ABSTRACT

A roller drive assembly comprises a drive roller mounted in a frame in such a way that the roller can be pivoted by a drive such as an electric motor from a lower retracted position when the drive roller is stationary to one of two, upper operating positions when the drive roller is rotating, dependent on the direction in which the roller is pivoted. An outer shell forming part of the drive roller for engaging an object to be conveyed defines a first larger-area frictional surface projecting above which is a plurality of second smaller-area frictional surfaces. These second frictional surfaces are disposed in such a way that when the drive roller is pivoted from its retracted position into one of its operating positions, an object to be conveyed by the assembly is first contacted by the second frictional surfaces which, as the drive roller moves further into its operating position and thereby presses with greater force against the conveyed object, are displaced until they lie flush with said first frictional surface which can then make contact with said object to be conveyed.

7 Claims, 2 Drawing Sheets

ROLLER DRIVE ASSEMBLY

FIELD OF THE INVENTION

The present invention relates to a roller drive assembly, in particular for use in cargo loading systems for aircraft.

DESCRIPTION OF THE PRIOR ART

Conventionally, roller drive assemblies are used, for example, in the transport of cargo holders on roller conveyors. Such cargo holders may be containers or pallets, and when such containers are to be transported into the loading area of an aircraft for stowage there, the roller drive assembly is installed in the aircraft itself.

When such roller drive assemblies are turned on, the rollers they comprise are swung upwards from an inoperative position into an operating position in such a way as to press against the underside of a cargo container situated above them. Due to this frictional engagement the torque of the drive rollers can be transferred to the floor of the cargo container, so that the drive rollers propel it forward.

A basic problem with such roller drive assemblies is that although the tractive force, that is the force exerted by the drive roller on the object to be conveyed, should be made as great as possible, the roller itself should not be very large. The force that lifts the roller from its inoperative position into an operating position should be as small as possible because the power needed for this purpose is derived from the driving torque of the electric motor by way of a clutch arrangement.

In European Patent Specification EP 0 391 175 a roller drive assembly is described wherein because of the relationship between the directions of upward swing and rotation of the roller, the tractive force generates a perpendicular component so that when the drive roller engages the object to be conveyed, the movement swinging it into the operating position is reinforced. However, this occurs only when a tractive force is actually acting on the object to be conveyed and thus on the drive roller in the direction in which it is being swung, for which purpose in turn a minimal torque must be tapped off from the output of the drive motor during swinging, in order to achieve a firm frictional engagement between the drive roller and the object to be conveyed. Especially when the drive rollers and/or the conveyed object are wet, difficulties may arise here.

The object of the present invention is to provide a roller drive assembly wherein the aforementioned problems are obviated or substantially mitigated and a secure frictional engagement is provided between a drive roller of the assembly and a conveyed object in a simple manner and with low swing torque.

SUMMARY OF THE INVENTION

According to the present invention there is provided a roller drive assembly comprising a frame; a drive roller mounted in the frame in such a way that the roller can be pivoted from a lower retracted position when the drive roller is stationary to one of two upper, operating positions when the drive roller is rotating, dependent on the direction in which the roller is pivoted; drive means for the drive roller an outer shell forming part of the drive roller for engaging an object to be conveyed and defining a first larger-area frictional surface projecting above which is a plurality of second smaller-area frictional surfaces that are disposed in such a way that when the drive roller is pivoted from its retracted position into one of its operating positions, an object to be conveyed by the assembly is first contacted by the second frictional surfaces which, as the drive roller moves further into its operating position and thereby presses with greater force against the conveyed object, are displaced until they lie flush with said first frictional surface which can then make contact with said object to be conveyed.

The assembly of the present invention operates in essentially in two stages. In the first stage the drive roller is swung up from its retracted position into an operating position with a relatively small torque, until the second smaller-area frictional surfaces of the drive roller make contact with the object to be conveyed. Because at the first contact the available forces are distributed over a relatively small area, a film of water or dirt can be pressed aside, so that frictional engagement is ensured, though only over a small area. This frictional engagement, however, causes the tractive force, or the torque with which the roller is put into rotation, to reinforce the torque in the direction of its upward swing, until the first larger-area surface of the roller engages the object to be conveyed. During this stage the smaller-area surfaces simultaneously recede or yield. Hence with a relatively small swing torque the net result is that a very large force presses the roller against the object. Therefore the driving torque of the electric motor can be exploited for traction with only a minor reduction by the customary braking devices to swing the drive roller.

Preferably, the material defining the first frictional surface is more rigid material than the material defining the second frictional surfaces. As a result, in the actual conveying operation only more rigid material is exposed to wear, which considerably increases the useful life of the roller drive assembly.

Preferably also, the second frictional surfaces have a higher coefficient of friction than the first frictional surface. Thus even with low pressing forces the frictional engagement is strong enough to swing the drive roller further up and hence increase the pressing force.

Preferably also, the drive roller is beveled at its ends. This ensures relatively uniform propulsion because in such a drive roller the bearing forces are lower in the middle with respect to the axial direction of the roller than at the ends when the roller is cylindrical.

Preferably also, the second frictional surfaces are disposed in the middle region of the drive roller with respect to its longitudinal axis. The reasons for this have been set out previously.

The second, smaller-area frictional surfaces can each be defined by individual elements such as knobs or the like. Transport proceeds especially smoothly when the second frictional surfaces are disposed in an annular manner around the drive roller. Such an arrangement is achieved especially simply when the second frictional surfaces are defined by O-rings located in grooves defined around the circumference of the outer shell of the drive roller.

BRIEF DESCRIPTION OF THE DRAWINGS

The present invention will now be described by way of example with reference to the accompanying drawings, in which.

DESCRIPTION OF A PREFERRED EMBODIMENT

Figure 1:
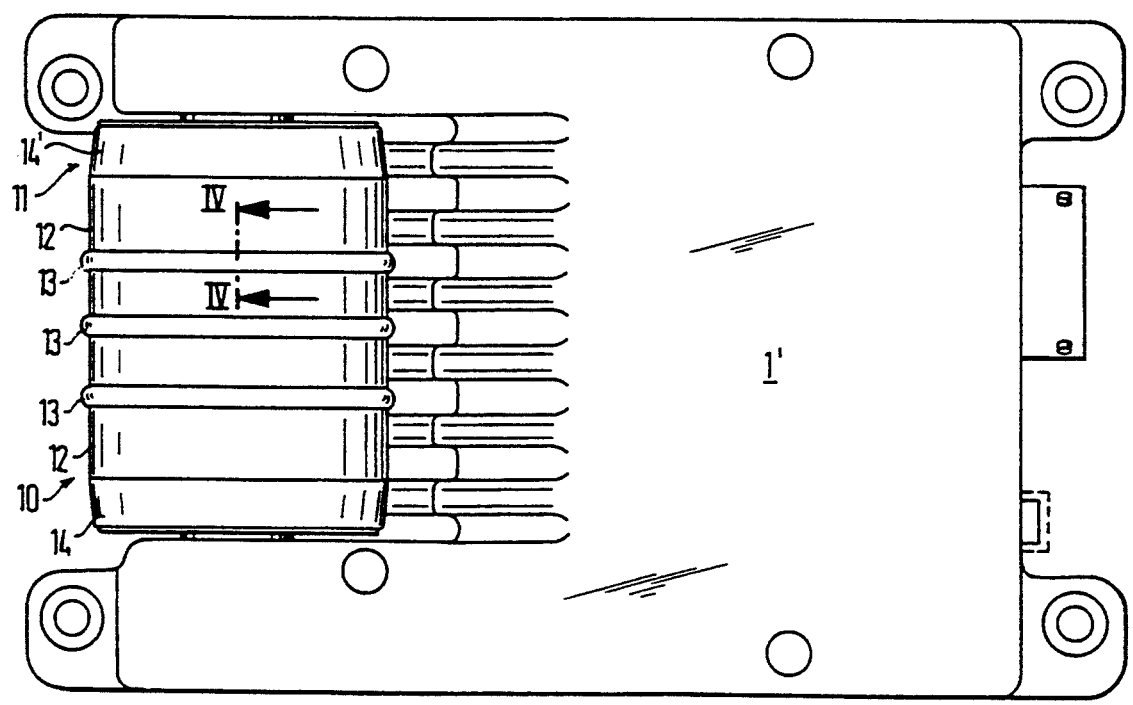
FIG. 1 is a plan view of a roller drive assembly according to the invention.
Figure 2:
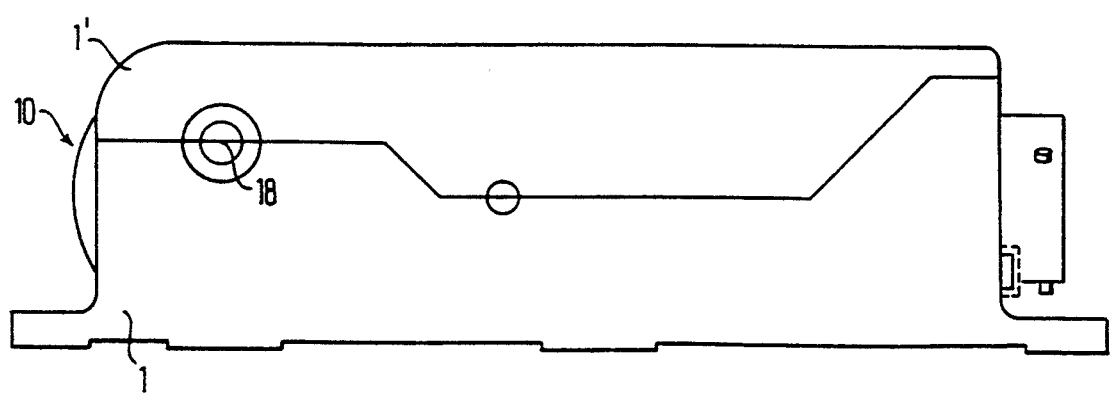
FIG. 2 is a side elevation of the assembly shown in FIG. 1.

As shown in the drawings, a roller drive assembly comprises a frame 1, 1' on which a drive roller 10 is rotatably mounted. A drive means for the roller 10 comprising an electric motor is mounted in a housing of the frame 1, 1' and linked to the drive roller 10 by a gear train (not shown).

Figure 3:
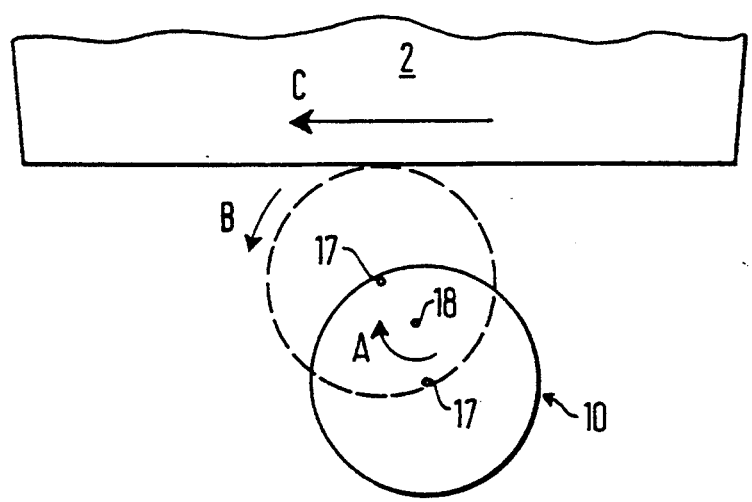
FIG. 3 is a schematic drawing showing pivotal movement of a drive roller forming part of the assembly.

The drive roller 10 can be pivoted about a swing axis eccentric to the axis of rotation 17, as shown in FIG. 3. In this drawing the continuous circle represents the drive roller 10 in its retracted, inoperative position. When the drive motor is turned on and the roller 10 rotates, it is swung up by rotation in the direction shown by arrow A while simultaneously-rotating about its axis of rotation 17. An operating position is indicated by the dashed circle in FIG. 3. In this operating position the drive roller 10 can engage with the underside of an object 2 to be conveyed, in order to move it in the direction of the arrow C.

The drive roller 10 comprises an outer shell 11 which is subdivided into several first, larger-area surfaces 12 and a plurality of second, smaller-area surfaces 13. The second surfaces 13 project above, in the radial direction, the first surfaces 12. In the marginal regions 14, 14' the drive roller 10 tapers conically, so that overall the drive roller 10 is beveled or somewhat barrel-shaped.

Figure 4:
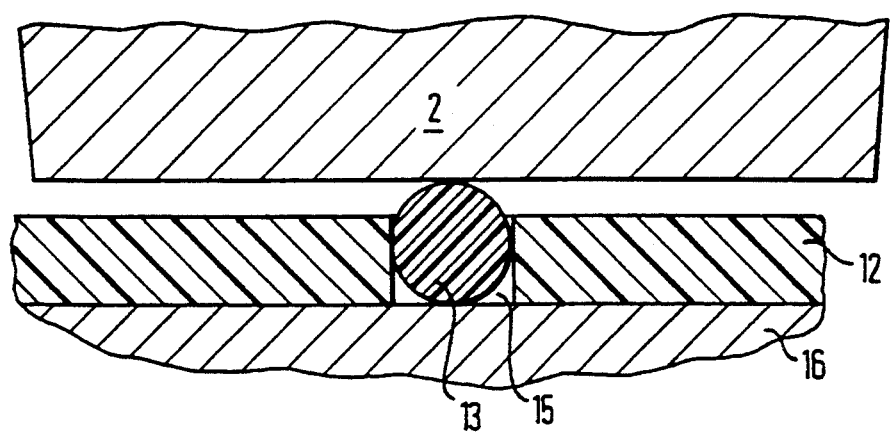
FIG. 4 is a partial cross-sectional view along the line IV—IV in FIG. 1.
Figure 5:
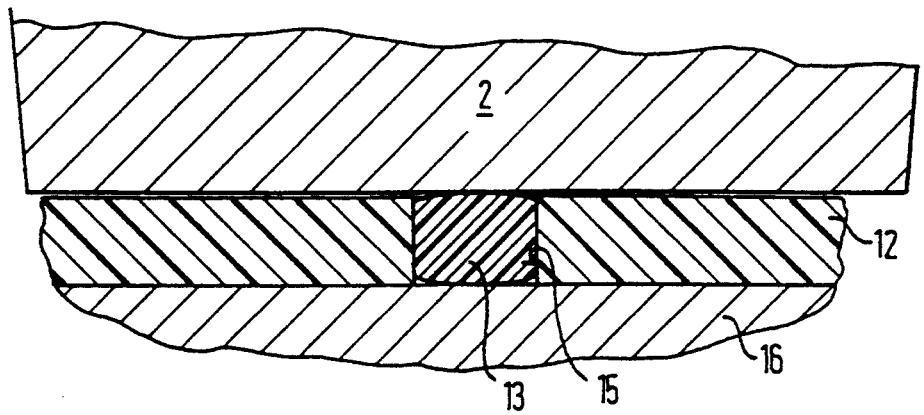
FIG. 5 is a view similar to FIG. 4 but when the drive roller is under load.

In the FIGS. 4 and 5 a partial radial section through the outer shell 11 of the drive roller 10 is shown. As can be seen in these drawings, the first frictional surfaces 12 are defined by a friction layer 12 which is mounted on a continuous sleeve 16 and which defines grooves 15. In the grooves 15 are seated 0-rings which define the second, smaller-area frictional surfaces 13.

Preferably, the material defining the first frictional surface is more rigid material than the material defining the second frictional surfaces. Also, the second frictional surfaces preferably have a higher coefficient of friction than the first frictional surface.

When the drive roller 10 is pivoted from its inoperative position (see FIG. 3) into an operating position, the first surfaces to contact the underside of the object 2 to be conveyed, as shown in FIG. 4, are the first, smaller-area frictional surfaces 13. The rotation of the drive roller 10 about its axis 17' (arrow B in FIG. 3) now reinforces the torque pivoting the drive roller 10 in the direction of arrow A (in FIG. 3), so that the drive roller 10 becomes "wedged". The force exerted radially by the object 2 to be conveyed is thereby increased in turn and the second frictional surfaces 13 are compressed, as shown in FIG. 5, until the underside of the object 2 rests on the first frictional surfaces 12. It is thereby ensured that despite a relatively low swing torque in the direction of the arrow A, the net result is a very high force pressing roller against conveyed object, which in turn leads to a very high tractive force in the direction of the arrow C in FIG. 3.

A further advantage of the relatively soft structure of the material defining the second frictional surfaces 13 is that when the drive roller 10 suddenly engages the object to be conveyed 2 or its leading edge during transport, the resulting impact is lessened and thus the wear on the whole roller drive assembly is reduced.

What is claimed is:

1. A roller drive assembly comprising
a frame;
a drive roller mounted in the frame in such a way that the roller can be pivoted from a lower retracted position when the drive roller is stationary to one of two, upper operating positions when the drive roller is rotating, dependent on the direction in which the roller is pivoted;
drive means for the drive roller;
an outer shell forming part of the drive roller for engaging an object to be conveyed and defining a first larger-area frictional surface projecting above which is a plurality of second smaller-area frictional surfaces that are disposed in such a way that when the drive roller is pivoted from its retracted position into one of its operating positions, an object to be conveyed by the assembly is first contacted by the second frictional surfaces which, as the drive roller moves further into its operating position and thereby presses with greater force against the conveyed object, are displaced until they lie flush with said first frictional surface which can then make contact with said object to be conveyed.

2. An assembly as claimed in claim 1, wherein the material defining the first frictional surface is more rigid material than the material defining the second frictional surfaces.

3. An assembly as claimed in claim 2, wherein the second frictional surfaces have a higher coefficient of friction than the first frictional surface.

4. An assembly as claimed in claim 1, wherein the drive roller is beveled at its ends.

5. An assembly as claimed in claim 1, wherein the second frictional surfaces are disposed in the middle region of the drive roller with respect to a longitudinal axis thereof.

6. An assembly as claimed in claim 1, wherein the second frictional surfaces are each disposed annularly around the circumference of the drive roller.

7. An assembly as claimed in claim 1, wherein the second frictional surfaces are defined by 0-rings located in grooves defined around the circumference of the outer shell of the drive roller.

* * * * *